(12) United States Patent
Holman et al.

(10) Patent No.: US 8,845,115 B2
(45) Date of Patent: Sep. 30, 2014

(54) FLASH ILLUMINATION SYSTEM

(75) Inventors: Robert L. Holman, San Jose, CA (US); Matthew B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 164 days.

(21) Appl. No.: 13/398,343

(22) Filed: Feb. 16, 2012

(65) Prior Publication Data

US 2013/0215596 A1   Aug. 22, 2013

(51) Int. Cl.
*G03B 15/05*   (2006.01)

(52) U.S. Cl.
USPC ............................ 362/11; 362/12; 396/200

(58) Field of Classification Search
USPC ............... 362/3, 11–12, 16–18; 257/98–100; 396/200
See application file for complete search history.

(56) References Cited

U.S. PATENT DOCUMENTS

| | | |
|---|---|---|
| 7,072,096 B2 | 7/2006 | Holman et al. |
| 7,832,878 B2 | 11/2010 | Brukilacchio et al. |
| 7,889,430 B2 | 2/2011 | El-Ghoroury et al. |
| 8,003,998 B2 | 8/2011 | Bogner et al. |
| 2007/0257272 A1 | 11/2007 | Hutchins et al. |
| 2008/0192153 A1 | 8/2008 | Kuhn et al. |
| 2009/0115313 A1* | 5/2009 | Lu et al. ............ 313/503 |
| 2010/0053959 A1 | 3/2010 | Ijzerman et al. |
| 2012/0199852 A1* | 8/2012 | Lowes et al. ............ 257/88 |

FOREIGN PATENT DOCUMENTS

| | | |
|---|---|---|
| EP | 1710846 A1 | 10/2006 |
| FR | 2940679 A1 | 7/2010 |
| JP | 2000180962 A | 6/2000 |

OTHER PUBLICATIONS

International Search Report and Written Opinion—PCT/US2013/022774—ISA/EPO—Jun. 17, 2013.
Peng C., et al., "A High Power Light Emitting Diode Module for Projection Display Application," 2010 11th International Conference on Electronic Packaging Technology & High Density Packaging, 2010, pp. 1412-1416.
Yu X.J., et al., "LED-Based Projection Systems," Journal of Display Technology, Sep. 2007, vol. 3 (3), pp. 295-303.

* cited by examiner

*Primary Examiner* — Diane Lee
*Assistant Examiner* — Gerald J Sufleta, II
(74) *Attorney, Agent, or Firm* — Knobbe, Martens, Olson & Bear LLP

(57) ABSTRACT

Systems and methods for flash illumination are disclosed. In one aspect, a flash illumination system includes sections each including a light source and a reflector. Each of the light sources includes a single light-emitting region having a first centroid and a package surrounding the single light-emitting region. The package has an exit aperture having a second centroid. The first centroid can be laterally offset from the second centroid. The reflectors include an input aperture, an output aperture, and one or more sidewalls therebetween. The input aperture is optically coupled to the exit aperture. One or more sidewalls are configured to collimate light propagating from the light source.

24 Claims, 8 Drawing Sheets

FLASH ILLUMINATION SYSTEM

TECHNICAL FIELD

This disclosure relates to flash illumination systems, for example, in cameras.

DESCRIPTION OF THE RELATED TECHNOLOGY

Flash illumination systems, such as those in cameras, can provide a momentary amount of supplemental lighting to illuminate a subject to be photographed. For example, cameras can include built-in flash illumination systems to provide a flash of supplemental light, such as a discharge of light having a duration on the order of milliseconds. Flash illumination systems used in solid state cameras, for example in cellular telephones, have adverse properties. For example, the flash illumination systems in these devices can provide light from a single light emitting diode (LED) typically through a small 5 millimeter (mm)×5 mm aperture. In such systems, a significant amount of light can be wasted because light is surface-emitted from the LED in all directions (for example, at a half angle of about ±90° of the normal direction). In some devices, a single LED is combined with one or more lenses to direct a portion of the light emitted in all directions into an angular direction generally directed at the subject to be photographed. These lenses generally collect, and therefore direct toward the subject, only a small portion of the total light emitted by the LED. In addition, when used with white LED emitters, the lens's chromatic aberrations combine with the generally uneven color spatial uniformity of the LED emission to produce white output light with various color non-uniformities, especially a yellow-brown ring surrounding the directed light.

SUMMARY

The systems, methods and devices of the disclosure each have several innovative aspects, no single one of which is solely responsible for the desirable attributes disclosed herein.

In some implementations, a flash illumination system includes a plurality of sections. Each section includes a light source and a reflector. The light source includes a single light-emitting region having a first centroid. The light source also includes a package surrounding the single light-emitting region. The package has an exit aperture having a second centroid. The first centroid is laterally offset from the second centroid. The reflector includes an input aperture, an output aperture, and one or more sidewalls between the input aperture and the output aperture. The input aperture is optically coupled to the exit aperture of the package. The one or more sidewalls are configured to collimate light propagating from the light source. The plurality of sections can include four sections in a cross-quad configuration. The single light-emitting regions can be asymmetric with each of the other single light-emitting regions. The single light-emitting region can include a blue light emitting diode (LED) chip and the package can include yellow phosphor surrounding the blue LED chip. The reflectors can be configured to substantially preserve etendue. A distance between the input aperture and the output aperture of the reflectors can be less than a calculated length configured to preserve etendue for a mathematically shaped reflector.

In some implementations, a flash illumination system includes a plurality of sections. Each section includes means for producing light and means for collimating light propagating from the light-producing means. The means for producing light includes means for emitting light and a package surrounding the light-emitting means. The light-emitting means has a first centroid. The package has an exit aperture. The exit aperture has a second centroid. The first centroid is laterally offset from the second centroid. The plurality of sections can include four sections in a cross-quad configuration. The light-emitting means can be asymmetric with each of the other light-emitting means. The light-producing means can include a light source. The light-emitting means can include a single light-emitting region. The light-collimating means can include a reflector including an input aperture optically coupled to an exit aperture of the light-producing means, an output aperture, and one or more sidewalls between the input aperture and the output aperture. The light-producing means can include a blue light emitting diode (LED) chip and yellow phosphor. The light-collimating means can be configured to substantially preserve etendue.

In some implementations, a flash illumination system includes a plurality of sections. Each section includes a light source and a reflector. The light source includes a single light-emitting region having a first centroid. The reflector includes an input aperture, an output aperture, and one or more sidewalls between the input aperture and the output aperture. The input aperture has a second centroid. The first centroid is laterally offset from the second centroid. The input aperture is optically coupled to the light source. The one or more sidewalls are configured to collimate light propagating from the light source.

In some implementations, a method for fabricating a flash illumination system includes providing a plurality of sections in the flash illumination system and, for each of the plurality of sections, optically coupling an input aperture of a reflector to an exit aperture of a package of a light source. The light source includes a single light-emitting region having a first centroid. The exit aperture has a second centroid. The first centroid is laterally offset from the second centroid. The reflector includes one or more sidewalls between the input aperture and an output aperture. The one or more sidewalls are configured to collimate light propagating from the light source. The single light-emitting region can include a blue LED chip and the packages can include yellow phosphor surrounding the blue LED chip. The reflectors can be configured to substantially preserve etendue. Optically coupling the input aperture to the exit aperture can include optically coupling four input apertures to four exit apertures in four sections in a cross-quad configuration. The method further can include arranging four single light-emitting regions asymmetrically from each of the other single light-emitting regions.

In some implementations, a method of providing flash illumination includes, in each of a plurality of sections, producing light from a light source within a respective section. The light source includes a single light-emitting region having a first centroid, and a package surrounding the single light-emitting region. The package has an exit aperture having a second centroid. The first centroid is laterally offset from the second centroid. The method further includes collimating the light propagating from the light source with one or more sidewalls of a reflector. The one or more sidewalls are between an input aperture and an output aperture. The input aperture is optically coupled to the exit aperture of the package. Each of the single light-emitting regions can include a blue LED chip and each of the packages can include yellow phosphor surrounding the blue LED chip. Collimating the light can include substantially preserving etendue. The plurality of sections can include four sections in a cross-quad configuration. The single light-emitting regions can be asymmetric with each of the other single light-emitting regions.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
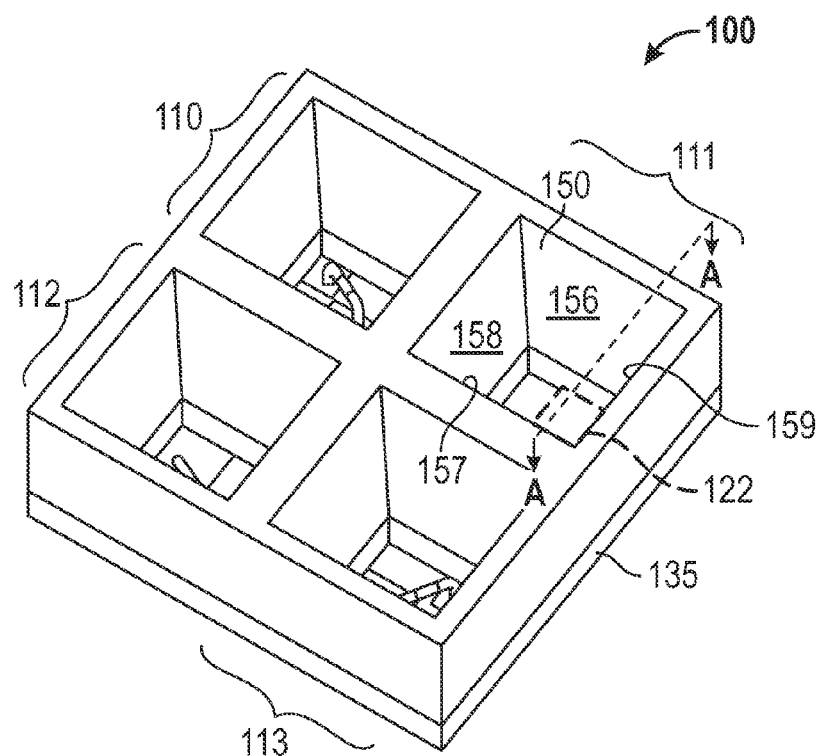
FIG. 1A shows an example of a flash illumination system.

The following detailed description is directed to certain implementations for the purposes of describing the innovative aspects. However, the teachings herein can be applied in a multitude of different ways. The described implementations may be implemented in any device that is configured to provide flash illumination, whether provided automatically or manually, to a subject whose image is to be captured, whether stationary (e.g., still image) or in motion (e.g., video). More particularly, it is contemplated that the implementations may be implemented in or associated with a variety of electronic devices capable of capturing images, such as, but not limited to, cameras, camcorders, mobile telephones, multimedia Internet enabled cellular telephones, smartphones, personal data assistants (PDAs), hand-held or portable computers, notebooks, netbooks, tablet personal computers, webcams, and MP3 players. The teachings herein also can be used in flash illumination systems configured to be used with electronic devices capable of capturing images, some of which are described above, yet are provided as separate and distinct devices. Thus, the teachings are not intended to be limited to the implementations depicted solely in the figures, but instead have wide applicability as will be readily apparent to a person having ordinary skill in the art.

Certain implementations of flash illumination systems can provide a directional source of flash illumination by using an array of separate light sources. The flash illumination system can include uniquely positioned single light-emitting regions of the light sources within separate sections. A section of certain implementations is a distinct portion of the whole flash illumination system, and includes a light source and a reflector configured to collimate light propagating from that light source. In certain implementations, the single light-emitting regions in the separate light sources can be positioned laterally offset from the center of each light source package and/or of each separate section. Each light-emitting region can be positioned asymmetrically from one another. Certain flash illumination systems also can include collimating reflectors that are mathematically shaped to substantially preserve etendue (e.g., to preserve etendue). In some implementations, the light sources of the flash illumination system can include blue LED chips surrounded by yellow phosphor to produce white light.

Particular implementations of the subject matter described in this disclosure can be implemented to realize one or more of the following potential advantages. For example, certain implementations described herein can provide a source of flash illumination such that the light generated can be used efficiently and with resistance to spatial variations in color uniformity. In various implementations, color uniformity, spatial uniformity, and/or efficiency of field coverage can be achieved by providing an array of smaller separate light sources. For example, the aperture of a light-emitting device can be divided into smaller sections, each having a separate light source. Uniformity and/or efficiency can be achieved by uniquely positioning separate primary light sources within each light source package and/or each separate section. For example, the separate light sources can be positioned asymmetrically from one another to improve color and/or spatial uniformity of the total emitted light. The light from the separate light sources also can be collimated into a desired direction to improve efficiency, e.g., by etendue preserving reflectors having light collecting and collimating properties that can reduce an amount of wasted light. Thus, as described above, certain implementations of a flash illumination system can include sections of uniquely positioned light sources and collimating reflectors to achieve color and spatial uniformity and efficient field coverage.

Figure 1B:
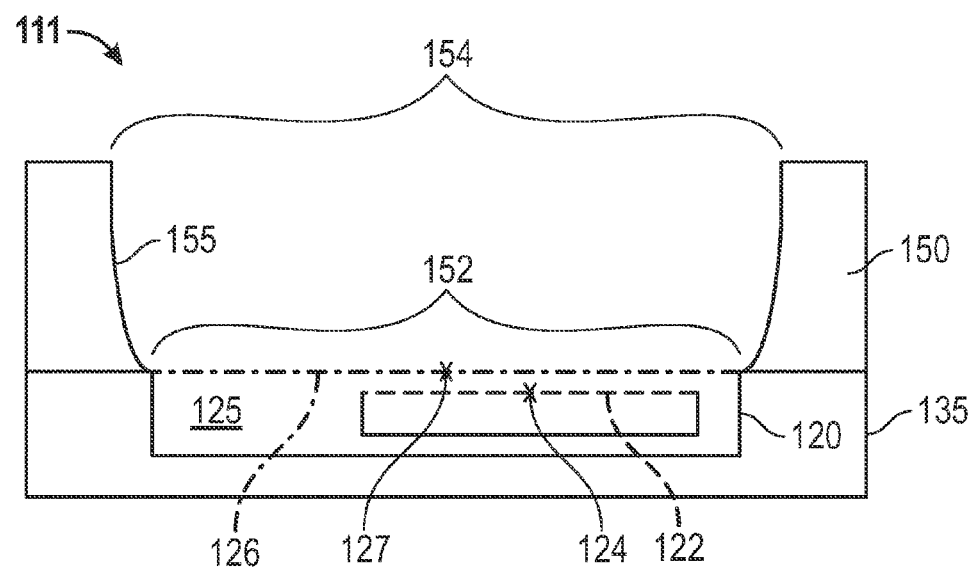
FIG. 1B shows a cross-sectional view of a single section in the flash illumination system shown in FIG. 1A.

FIG. 1A shows an example of a flash illumination system 100. FIG. 1B shows a cross-sectional view of a single section 111 in the flash illumination system 100 shown in FIG. 1A. Specifically, FIG. 1B is the cross-sectional view of section 111 along the line A-A in FIG. 1A, although the description is applicable to each of the sections 110, 111, 112, and 113. The flash illumination system 100 includes multiple sections 110, 111, 112, and 113. Each of the sections 110, 111, 112, and 113 includes a light source 120 and a reflector 150. As shown in FIG. 1B, the light source housing 135 houses the light source 120, which includes a single light-emitting region 122 (shown as a dashed line in FIGS. 1A and 1B) and a light source package 125 surrounding the single light-emitting region 122.

In certain implementations, the single light-emitting region 122 within each section 110, 111, 112, and 113 is laterally offset from the center of the exit aperture 126 (shown as a dot-dashed line in FIG. 1B) of the light source package 125. For example, the single light-emitting region 122 has a centroid located at the point 124 in FIG. 1B. The exit aperture 126 of the light source package 125 has a centroid located at the point 127 in FIG. 1B. As shown in FIG. 1B, the centroid 124 of the single light-emitting region 122 is laterally offset from the centroid 127 of the exit aperture 126 of the light source package 125. In certain implementations, a lateral offset is a non-zero distance between the centroids in a plane parallel to either a plane defined by the single light-emitting region 122 or the exit aperture 126 of the light source package 125. Note that the distance and the direction of the lateral offset from the centroid in each of the sections may or may not be the same as the lateral offsets in the other sections. The reflector 150 of each section 110, 111, 112, and 113 includes an input aperture 152 that can be optically coupled to the exit aperture 126 of the light source package 125. The reflector 150 further includes an output aperture 154 and one or more sidewalls 155 between the input aperture 152 and the output aperture 154. One or more sidewalls 155 can be configured to collimate light propagating from the light source 120.

Figure 2A:
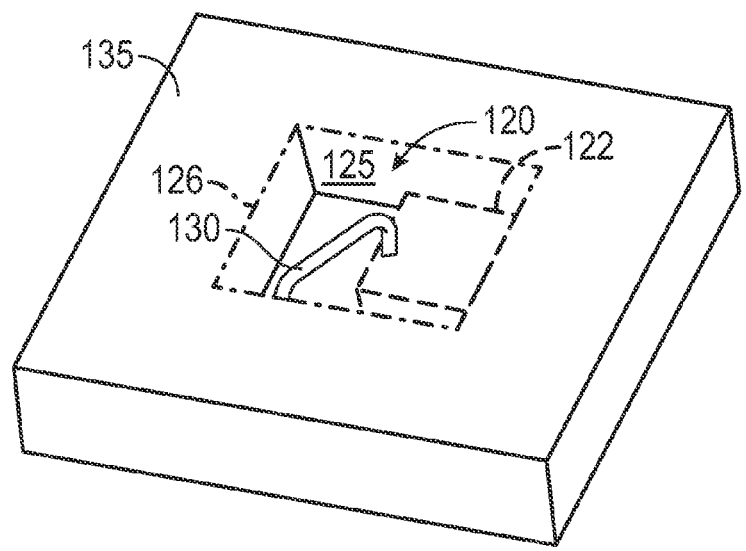
FIG. 2A shows a perspective view of the light source in a light source housing of a section of the flash illumination system shown in FIG. 1A.
Figure 2B:
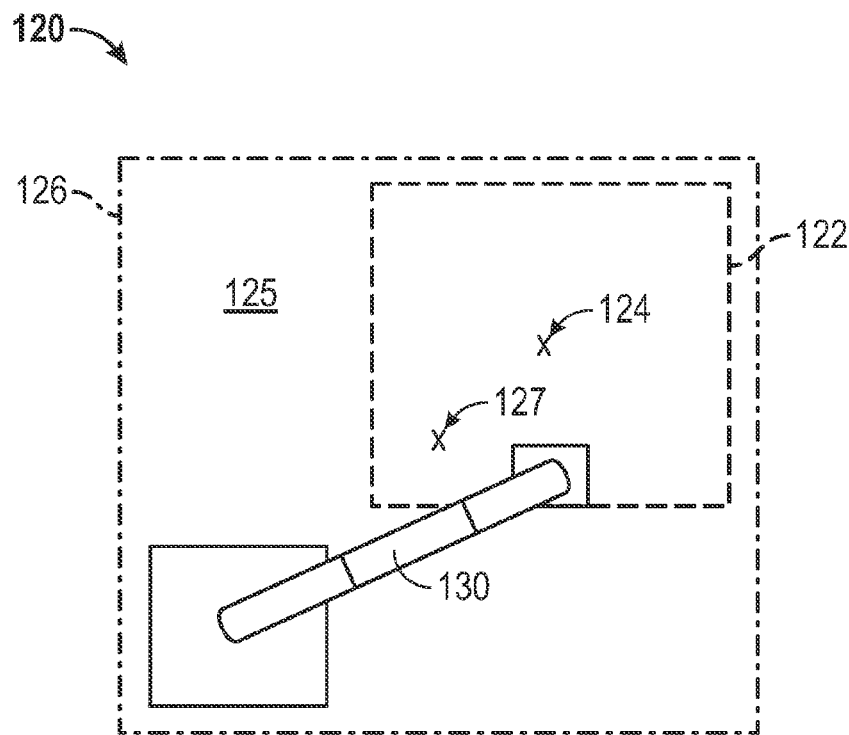
FIG. 2B shows a top view of the example light source shown in FIG. 2A.

FIG. 2A shows a perspective view of the light source 120 in a light source housing 135 of a section (e.g., the section 110, 111, 112, or 113) of the flash illumination system 100 shown in FIG. 1A. FIG. 2B shows a top view of the example light source 120 shown in FIG. 2A. The light source 120 includes a single light-emitting region 122. As discussed herein, the light source 120 also includes a package 125 surrounding the single light-emitting region 122. The package 125 has an exit aperture 126.

In some implementations, the single light-emitting region 122 and the exit aperture 126 of the light source package 125 have cross-sectional or top view shapes of a rectangle or a square. Other shapes of the single light-emitting region 122 and the exit aperture 126 (e.g., trapezoidal, polynomial, circular, ovular) are also possible. The area of the light-emitting region 122 in some implementations is between about 0.01 mm$^2$ and about 0.04 mm$^2$ or between about 0.02 mm$^2$ and about 0.03 mm$^2$. For example, the light-emitting region 122 can be about 0.16 mm×0.16 mm in size or about 0.026 mm$^2$ in area. The area of the exit aperture 126 in some implementations is between about 0.5 mm$^2$ and about 2 mm$^2$, between about 0.6 mm$^2$ and about 1.9 mm$^2$, between about 0.7 mm$^2$ and about 1.8 mm$^2$, between about 0.8 mm$^2$ and about 1.7 mm$^2$, between about 0.9 mm$^2$ and about 1.6 mm$^2$, or between about 1 mm$^2$ and about 1.5 mm$^2$. For example, the exit aperture 126 can be about 1 mm×1 mm in size or about 1.25 mm×1.25 mm in size. Although the single light-emitting region 122 and the exit aperture 126 are shown in FIGS. 2A and 2B to have a similar shape, e.g., square, the single light-emitting region 122 and the exit aperture 126 can have different cross-sectional shapes. For example, the cross-sectional shape of the single light-emitting region 122 may be a rectangle, while the cross-sectional shape of the exit aperture 126 may be a square.

In some implementations, the single light-emitting region 122 includes one LED chip. In some implementations, the single light-emitting region 122 includes more than one LED chip. For example, the single light-emitting region 122 may include an array of x×y LED chips (for example, x rows by y columns, or x columns by y rows). As described herein, a single light-emitting region 122 refers to the total region where light is produced in the light source 120. For example, in certain implementations of devices where a light source includes multiple LED chips, the lateral offset between the single light-emitting region 122 and the exit aperture 126 is a measure between the centroid 127 of the exit aperture 126 and the centroid of the entire area of the multiple LED chips. The LED chip or chips can be wire-bonded, e.g., as shown by the electrical connection 130, to electronic components in electrical communication with the package 125 (e.g., to a printed circuit board), and polymeric material (e.g., a resin or epoxy) can surround the single light-emitting region 122. As shown in FIG. 2A, the package 125 also can be surrounded by a housing 135. The housing 135 can include, for example, polymer, ceramic, metal, dielectric, combinations thereof, and the like, and may provide electrical communication between the light source 120 and other electronic components.

Various implementations of the light source 120 can be configured to output white light. For example, the light source 120 can include one or more white LED emitters. In some implementations, the white LED emitter can include a red, a green, and a blue LED chip. The light emitted from the red, green, and blue LED chips can combine to produce white light. For example, one or more white LED emitters can be similar to those available from Citizen Electronics Co., Ltd., Seoul Semiconductor Co., Ltd., Philips Lumileds Lighting Company, Cree, Inc., OSRAM Opto Semiconductors, or Nichia Corporation. In some implementations, the package 125 of the light source 120 includes phosphor, e.g., a conformal phosphor wrap or a phosphor layer surrounding an LED chip or chips. For example, the light source 120 can include yellow, yellow-green, or green phosphor surrounding a blue LED chip or blue LED chips to produce white light. In some implementations, a resin or epoxy surrounding the LED chip or chips includes the phosphor. In some implementations, one or more blue LED chips and phosphor resin are similar to those available from Nichia Corporation, Cree, Inc., or Philips Lumileds Lighting Company.

In various implementations, the light sources 120 of the sections 110, 111, 112, and 113 each include similar or identical components, e.g., each including one blue LED chip surrounded by yellow phosphor. In other implementations, the light sources 120 of the sections 110, 111, 112, and 113 include different components than one or more of the other sections 110, 111, 112, and 113. For example, one section may include white LED emitter having a set of red, green, and blue LED chips. For yet another example, one section may include yellow phosphor and another section may include yellow-green phosphor.

The example light source 120 shown in FIGS. 2A and 2B illustrates an example of a light source 120 for a section 110, 111, 112, or 113 of a flash illumination system 100. The light source 120 can be formed separately from each of the other light sources 120 of the flash illumination system 100 or can be formed integrally. As an example, for four light sources in a 2×2 cross-quad configuration as shown in FIG. 1A, a package housing 135 can be formed with four cavities to house the four single light-emitting regions 122 and package materials 125, forming four light sources 120 within a single package housing 135. Various methods of manufacturing such a housing 135 are possible. For example, a polymeric housing 135 can be injection molded with four cavities.

As shown in FIG. 2B, the single light-emitting region 122 can be laterally offset from the center of the exit aperture 126 of the light source package 125. For example, the single light-emitting region 122 has a centroid 124. The centroid 124 can be the center of mass of the two-dimensional emitting surface of the single light-emitting region 122. The exit aperture 126 of the package 125 also has a centroid 127. The centroid 127 can be the center of mass of the two-dimensional area of the exit aperture 126. The centroid 124 of the single light-emitting region 122 is laterally offset from the centroid 127 of the exit aperture 126 of the package 125. The lateral offset in some implementations is at least about 0.1 mm, at least about 0.15 mm, at least about 0.2 mm, at least about 0.25 mm, at least about 0.3 mm, at least about 0.35 mm, at least about 0.4 mm, at least about 0.45 mm, at least about 0.5 mm, at least about 0.6 mm, at least about 0.7 mm, at least about 0.75 mm, at least about 0.8 mm, at least about 0.9 mm, at least about 1 mm, at least about 1.5 mm, or at least about 1.75 mm. In certain implementations, the single light-emitting region 122 is arranged such that the centroid 124 of the single light-emitting region 122 is close to a corner of the exit aperture 126. In some cellular phone applications, the lateral offset is between about a non-zero distance and about 2 mm. For example, the single light-emitting region 122 can be about 0.16 mm×0.16 mm in size and the exit aperture 126 of the package 125 can be up to about 2.5 mm×2.5 mm. Given geometrical constraints, the lateral offset for this example can be up to about 1.8 mm. Other values for lateral offset are also possible, for example provided different dimensions of the light-emitting region 122 and/or the exit aperture 126.

The lateral offset in some implementations may be measured by a percentage of a length of a side (e.g., a largest side) of the exit aperture 126. In some implementations, the lateral offset is at least about 4%, at least about 6%, at least about 8%, at least about 10%, at least about 12%, at least about 14%, at least about 16%, at least about 18%, at least about 20%, at least about 24%, at least about 28%, at least about 30%, at least about 32%, at least about 36%, at least about 40%, at least about 60%, or at least about 70%. In certain implementations, the single light-emitting region 122 is arranged such that the centroid 124 of the single light-emitting region 122 is close to a corner of the exit aperture 126. In some cellular phone applications, the lateral offset is between about 10% and about 75%. For example, the single light-emitting region 122 can be about 0.16 mm×0.16 mm in size and the exit aperture 126 of the package 125 can be up to about 2.5 mm×2.5 mm. Given geometrical constraints, the lateral offset for this example can be up to about 72%. Other values for lateral offset are also possible, for example provided different dimensions of the light-emitting region 122 and/or the exit aperture 126.

Figure 3A:
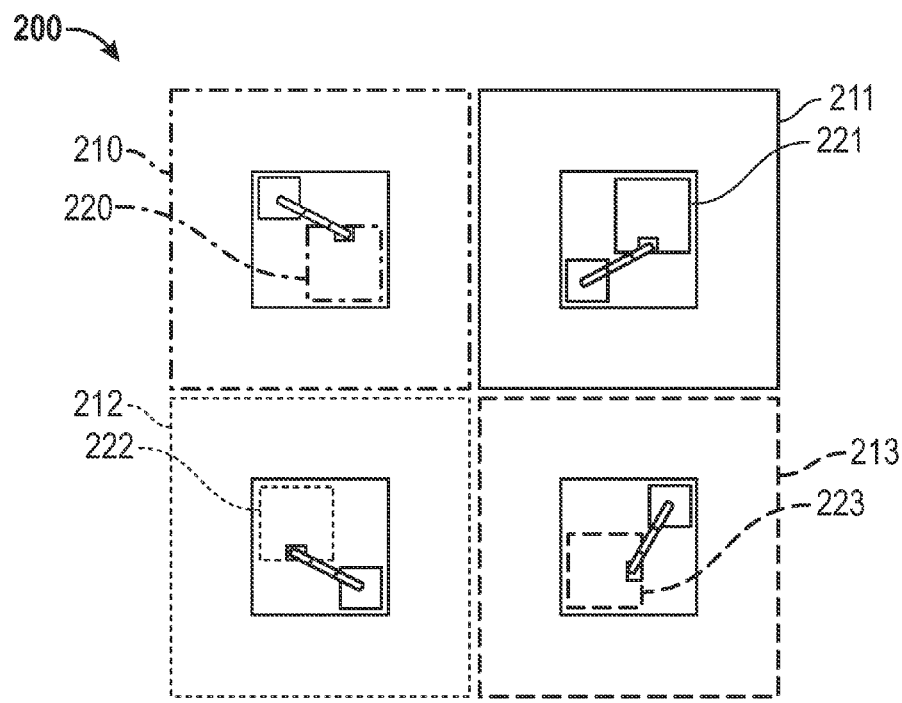
FIGS. 3A and 3B show top views of example arrangements of four light sources including four single light-emitting regions of four sections of a flash illumination system.
Figure 3B:
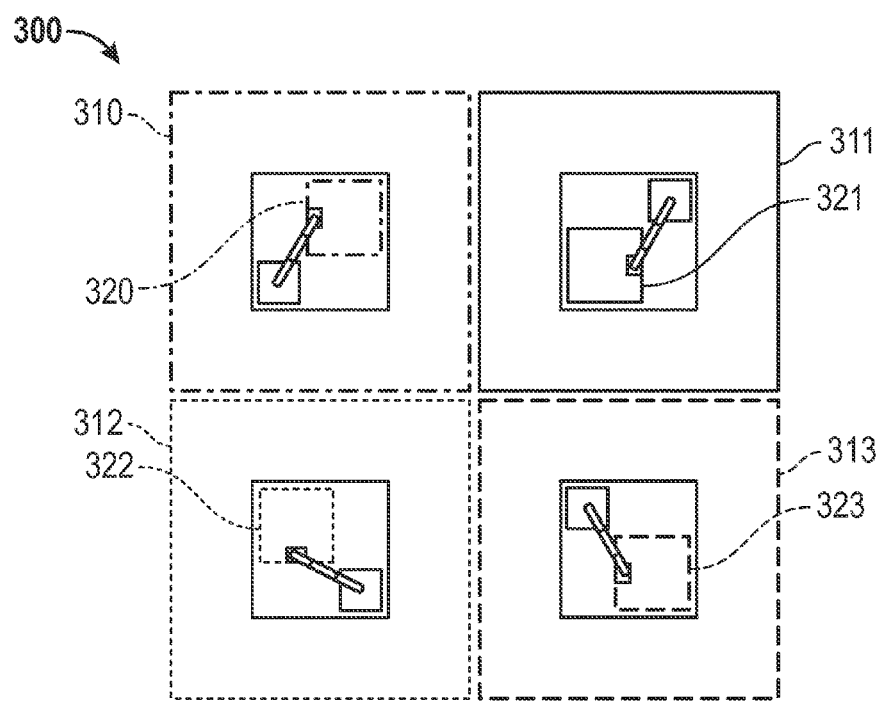

For the example illustrated in FIG. 2B, the light emitted from the single light-emitting region 122 can provide light with a higher intensity in the upper right corner than when centered on the centroid 127 of the exit aperture 126 of the package 125. When used in a flash illumination system 100 with other light sources 120 also having a laterally offset single light-emitting region 122, color uniformity, spatial uniformity, and/or efficient field coverage can be improved in certain implementations compared to some conventional flash illumination systems. Because of spatial mixing, visual appearance can appear more uniform. For example, in certain implementations of the flash illumination system 100, the single light-emitting regions 122 within the sections 110, 111, 112, and 113 can be positioned asymmetric with each of the other single light-emitting regions 122. Certain such implementations may increase color uniformity (e.g., to reduce or eliminate a yellow-brown halo), spatial uniformity of the total emitted light, and/or the efficiency of field coverage. For example, the intensity of light emitted from an LED chip within a light source 120 is usually highest at the center of the light emitting region and decreases radially outwardly, resulting in a spatial distribution of intensity. In certain implementations, separate sections of light sources can provide spatial uniformity of the emitted light spanning over a larger distance for the same aperture space, resulting in efficient field coverage. Color uniformity may also be affected by the spatial mixing of colored light. In the example of adjacent sections of white LED emitters, each emitter formed by a blue LED chip and a surrounding phosphor, the blue LED chips arranged asymmetrically with respect to the phosphor in each adjacent section, improved color uniformity can be achieved by the collective far field color mixing of the non-uniform light from each section. By having the phosphor layer asymmetrically surrounding the blue LED chip, improved color uniformity can be achieved FIGS. 3A and 3B show top views of example arrangements of four light sources including four single light-emitting regions of four sections of a flash illumination system. In FIG. 3A, the example flash illumination system 200 includes four sections 210, 211, 212, and 213. The flash illumination system 200 can be about 5 mm×5 mm in size, while the sections 210, 211, 212, and 213 may each be less than or equal to about 2.5 mm×2.5 mm. The four sections 210, 211, 212, and 213 in FIG. 3A are arranged in a cross-quad configuration. Section 210 is in the upper left hand corner, section 211 is in the upper right hand corner, section 212 is in the lower left hand corner, and section 213 is in the lower right hand corner. In this example, the four sections 210, 211, 212, and 213 form a 2×2 array. Other m×n arrays (for example, m rows by n columns, or m columns by n rows) including more than or less than four sections are possible, e.g., 1×2, 2×1, 1×3, 3×1, 1×4, 4×1, 2×2, 2×3, 3×2, 3×3, 3×4, 4×3, 4×4, and so forth. In some implementations, additional sections can be disposed at a position where four sections meet in an array. For example, an additional section can be positioned at the intersection of the cross in the 2×2 cross-quad configuration shown in FIG. 3A, resulting in five sections.

A first section 210 includes a first single light-emitting region 220 in a lower right portion of the first section 210. Lateral to the first section 210 is a second section 211. The second section 211 includes a second single light-emitting region 221 in an upper right portion of the second section 211. Lateral to the first section 210 and caddy-corner to the second section 211 is a third section 212. The third section 212 includes a third single light-emitting region 222 in an upper left portion of the third section 212. Lateral to the second section 211, lateral to the third section 212, and caddy-corner to the first section 210 is a fourth section 213. The fourth section 213 includes a fourth single light-emitting region 223 in a lower left portion of the fourth section 213. In this implementation, the single light-emitting regions 220, 221, 222, and 223 are asymmetric with each of the other single light-emitting regions, which when applied as input to the receiving apertures of corresponding reflectors as shown in FIG. 1A, then the result is better color uniformity, spatial uniformity, and/or efficient field coverage than some conventional flash illumination systems.

Other implementations of asymmetric single light-emitting regions are also possible, for example as shown in FIG. 3B. In FIG. 3B, the example flash illumination system 300 has four sections 310, 311, 312, and 313. A first section 310 includes a first single light-emitting region 320 in an upper right portion of the first section 310. Lateral to the first section 310 is a second section 311. The second section 311 includes a second single light-emitting region 321 in a lower left portion of the second section 311. Lateral to the first section 310 and caddy-corner to the second section 311 is a third section 312. The third section 312 includes a third single light-emitting region 322 in an upper left portion of the third section 312. Lateral to the second section 311, lateral to the third section 312, and caddy-corner to the first section 310 is a fourth section 313. The fourth section 313 includes a fourth single light-emitting region 323 in a lower right portion of the fourth section 313. The single light-emitting regions 320, 321, 322, and 323 of this implementation are asymmetric with each of the other single light-emitting regions, which when applied as input to the receiving apertures of corresponding reflectors as shown in FIG. 1A, then the result is better color uniformity, spatial uniformity, and/or efficient field coverage than some conventional flash illumination systems.

Figure 4:
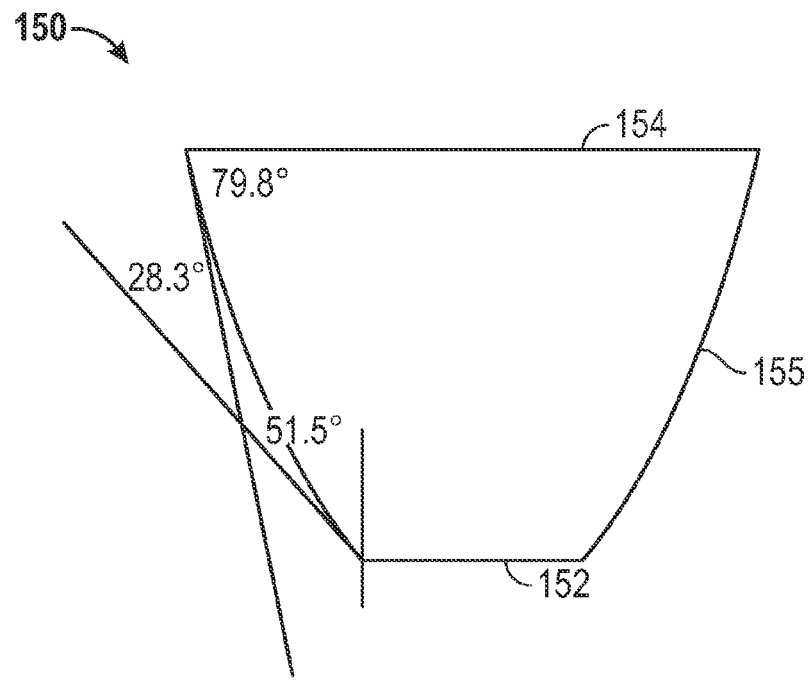
FIG. 4 shows a side view of an example reflector.

Referring again to the example flash illumination system 100 in FIG. 1A and the example section 111 in FIG. 1B, each section 110, 111, 112, and 113 includes a reflector 150. FIG. 4 shows a side view of an example reflector 150. Each reflector 150 includes an input aperture 152, an output aperture 154, and one or more sidewalls 155 therebetween. As shown in FIG. 1B, the input aperture 152 of the reflector 150 is optically coupled to the exit aperture 126 of the light source package 125. One or more sidewalls 155 are configured to collimate light propagating from the light source 120. In FIG. 1A, the reflectors have output apertures 154 that are slightly spaced from each other and include edges that have some thickness. These implementations are advantageous for manufacturability. For example, the edges can be between about 0.1 mm and about 1 mm. In other implementations, the output apertures may have contiguous and/or knife-like edges.

In some implementations, the input aperture 152 can have a rectangular (e.g., a square) cross-sectional area. The output aperture 154 also can have a rectangular (e.g., a square) cross-sectional area. Other shapes (e.g., trapezoidal, polynomial, circular, ovular) for the input aperture 152 and/or output aperture 154 can be used. In certain implementations, the shapes of the input aperture 152 and of the output aperture 154 can be the same or different from each other. The area of the input aperture 152 in some implementations is between about 0.5 mm$^2$ and about 2 mm$^2$, between about 0.6 mm$^2$ and about 1.9 mm$^2$, between about 0.7 mm$^2$ and about 1.8 mm$^2$, between about 0.8 mm$^2$ and about 1.7 mm$^2$, between about 0.9 mm$^2$ and about 1.6 mm$^2$, or between about 1 mm$^2$ and about 1.5 mm$^2$. For example, the input aperture 152 can be about 1 mm×1 mm in size or about 1.25 mm×1.25 mm in size. The area of the output aperture 154 in some implementations is between about 1 mm$^2$ and about 6.5 mm$^2$ or between about 1.25 mm$^2$ and about 6.25 mm$^2$. For example, in some cellular phone applications, the flash illumination system 100 is about 5 mm×5 mm in size and includes four reflectors 150 each having output apertures 154 of about 2.5 mm×2.5 mm in size or about 6.25 mm$^2$ in area.

As shown in FIG. 1B, since the input aperture 152 of the reflector 150 is optically coupled to the exit aperture 126 of the light source package 125, the input aperture 152 has the same shape and/or the same area as the exit aperture 126. In other implementations, the input aperture 152 and the exit aperture 126 may have a different shapes and/or areas.

In some implementations, one or more sidewalls 155, as shown in FIG. 1A, include a first sidewall 156, a second sidewall 157 (opposite from and facing the first sidewall 156), a third sidewall 158, and a fourth sidewall 159 (opposite from and facing the third sidewall 158). The first sidewall 156 and the second sidewall 157 may be considered a pair of sidewalls, and the third sidewall 158 and the fourth sidewall 159 may also be considered a pair of sidewalls, so the reflector 150 may be considered to include pairs of sidewalls.

One or more sidewalls 155 can be configured to collimate light propagating from the exit aperture 126 of the light source 120. For example, the sidewalls 156, 157, 158, and 159 of the reflector 150 can collimate light from about ±90° to between about ±20° and about ±40° off a normal direction. For example, the reflector 150 can collimate light from about ±90° to about ±20°, to about ±25°, to about ±30°, to about ±35°, to about ±40°, etc., off a normal direction. In certain implementations, the reflector 150 collects and collimates light into a desired direction to reduce waste of light as described herein.

Figure 5:
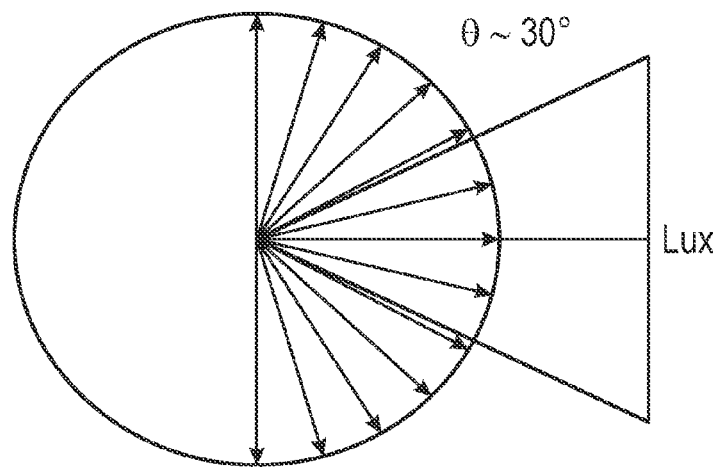
FIG. 5 shows an example of collimation of light from a Lambertian light source.

FIG. 5 shows an example of collimation of light from a Lambertian light source. As shown in FIG. 5, light from a Lambertian light source can be collimated from the emission half angle of about ±90° to a half angle of about ±30° off a normal direction to reduce waste per lumen. For example, up to about 0.75 lumens per lumen can be wasted when only light at about ±30° is used from an LED emitting light at about ±90° off a normal direction. Some implementations of flash illumination systems with collimating reflectors can emit light that is brighter than flash illumination systems without collimating reflectors because at least some of the light that would have been wasted due to not being between about ±30° is collimated to be included in the light at about ±30° off a normal direction. In some implementations in which light from a Lambertian source is collimated to about ±30°, a four-times gain in lux can be achieved compared to no collimation. The uniformity of light can also be increased by two-times. In other implementations (e.g., in which light from a Lambertian source is collimated to less than about ±30°), greater than four-times gain in lux can be achieved compared to no collimation. The uniformity of light can also be increased by greater than two-times.

In some implementations, the reflector 150 includes an etendue preserving reflector. For example, to preserve etendue, one or more sidewalls 155, e.g., 156, 157, 158, and 159, of the reflector 150 are mathematically shaped between a first width $w_1$ or area $A_1$ of the input aperture 152, a second width $w_2$ or area $A_2$ of the output aperture 154, and the half angle $\theta$ of the collimated light exiting the output aperture 154. In some implementations in which the half angle of the light entering the input aperture is about ±90° (e.g., from a Lambertian source), the mathematical shape can be governed by a Sine Law reflector design as described in Equations (1A) and (1B).

$$w_1 \times \sin 90° = w_2 \times \sin \theta \qquad \text{Equation (1A)}$$

$$A_1 \times \sin^2 90° = A_2 \times \sin^2 \theta \qquad \text{Equation (1B)}$$

Since the sine of 90° is unity, or the sine of about 90° approaches unity, the mathematical shape can be governed by a Sine Law reflector design as described in reduced Equations (2A) and (2B).

$$w_1 = w_2 \times \sin \theta \qquad \text{Equation (2A)}$$

$$A_1 = A_2 \times \sin^2 \theta \qquad \text{Equation (2B)}$$

The length L of the reflector 150, the distance between the input aperture 152 and the output aperture 154, can be given by the Equation (3).

$$L = 0.5 * (w_1 + w_2)/\tan \theta \qquad \text{Equation (3)}$$

In certain implementations, the collimation half angles are between about 20° and about 40°, e.g., about 25°, about 30°, or about 35°. For output apertures 154 having a width $w_2$ of about 2.5 mm, the reflectors 150 may have ideal lengths L between about 2.5 mm and about 4.5 mm, e.g., about 2.8 mm, about 3.25 mm, or about 3.8 mm, which may be truncated for certain applications as will be discussed below. In some examples, the mathematical shape of one or more sidewalls 155, e.g., 156, 157, 158, and 159, is a shape of a complex polynomial. In further examples, the mathematical shape is that of a tilted parabolic shape as in a compound parabolic collector (CPC), which also may be expressed in the form of a complex polynomial.

In some implementations, one or more sidewalls 155, e.g., 156, 157, 158, and 159, include a metallic material, e.g., either fabricated from metal or a polymeric material coated with a metallic film. The sidewalls 156, 157, 158, and 159 can be the same or different (e.g., having different mathematical shapes, tilt angles, etc.) from each of the other sidewalls, and the pairs of opposing sidewalls can be the same or different (e.g., having different mathematical shapes, tilt angles, etc.) from each other.

The example reflector 150 shown in FIG. 4 illustrates an example of a single reflector 150 for a single section 110, 111, 112, and 113 of a flash illumination system 100. The reflector 150 can be formed separately from each of the other reflectors 150 of the flash illumination system 100 or can be formed integrally. As an example, for four reflectors 150 in a 2×2 cross-quad configuration as shown in FIG. 1A, the interconnected structure can be formed by forming four holes in a material having a thickness, forming four reflectors 150 within a structure. As another example, polymeric material may be injection molded into the shape and then coated with a reflective material. Various methods of manufacturing such a structure are possible.

Figure 6A:
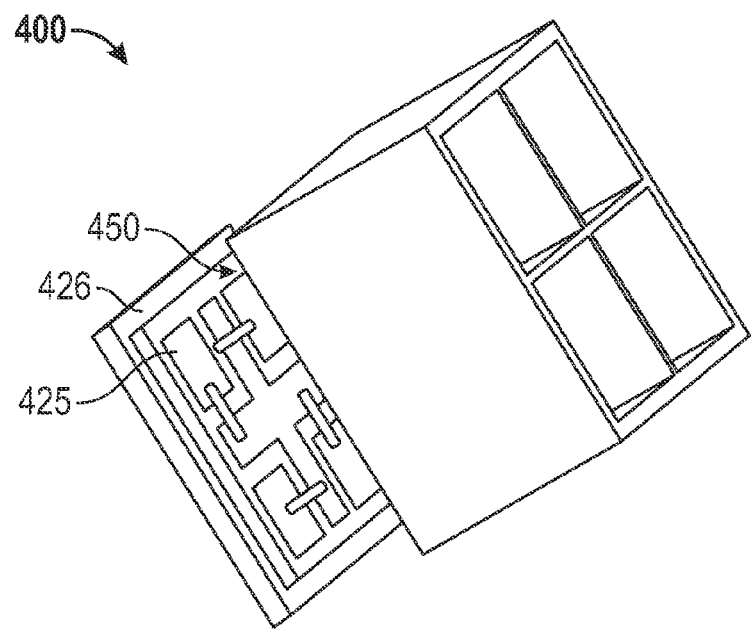
FIGS. 6A and 6B show example methods of collectively coupling input apertures of an interconnected reflector structure to exit apertures of a light source package housing.
Figure 6B:
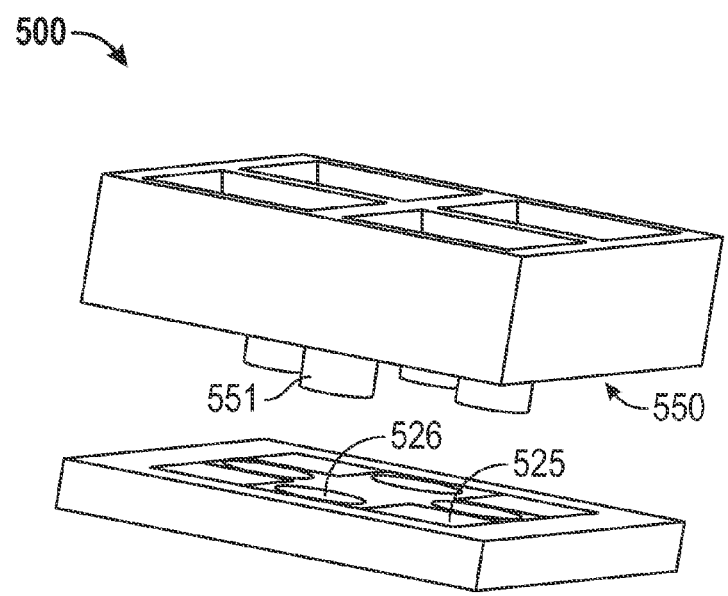

Each input aperture 152 can be optically coupled to each exit aperture 126 separately or collectively as a group. FIGS. 6A and 6B show example methods of collectively coupling input apertures of an interconnected reflector structure to exit apertures of a light source package housing. In FIG. 6A, the input apertures 450 (not shown, but in the general direction of the arrow 450) of four reflectors are coupled collectively to the exit apertures 425 of four light sources to form the flash illumination system 400. The four exit apertures 425 are in a package housing including a flange 426, and the input apertures 450 are connected to a bezel structure (not shown) that fits around the area protruding from the flange 426. In FIG. 6B, the input apertures 550 (not shown but in the general direction of the arrow 550) of four reflectors are coupled collectively to the exit apertures 525 of four light sources to form the flash illumination system 500. The four exit apertures 525 are in a package housing including four openings 526, and the input apertures 550 are connected to protrusions 551 that fit within the openings 526. The openings 526 may partially or fully protrude through the package housing. Other collective coupling methods and individual coupling methods are possible.

Figure 7A:
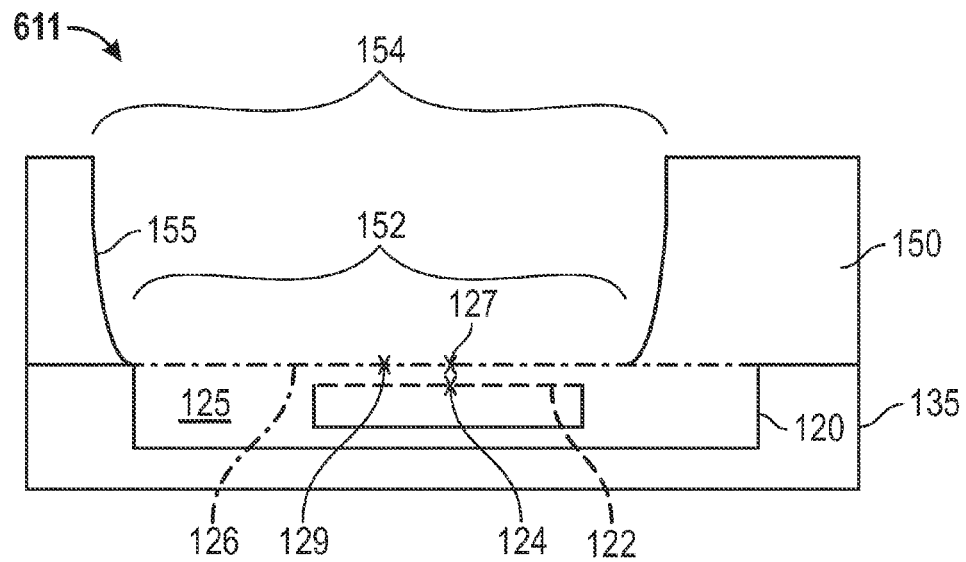
FIG. 7A shows a cross-sectional view of another single section usable in a flash illumination system.

FIG. 7A shows a cross-sectional view of another single section 611 usable in a flash illumination system. As shown in FIG. 7A, the light source housing 135 houses the light source 120, which includes a single light-emitting region 122 (shown as a dashed line) and a light source package 125 surrounding the single light-emitting region 122.

In certain implementations, the single light-emitting region 122 within a section 611 is not laterally offset from the center of the exit aperture 126 (shown as a dot-dashed line in FIG. 7A) of the light source package 125, but is laterally offset from the center of the input aperture 152 of the reflector 150. For example, the single light-emitting region 122 has a centroid located at point 124 in FIG. 7A. The input aperture 152 of the reflector 150 also has a centroid located at point 129 in FIG. 7A. As shown in FIG. 7A, the centroid 124 of the single light-emitting region 122 is laterally offset from the centroid 129 of the input aperture 152 of the reflector 150. The input aperture 152 of the reflector 150 can be optically coupled to the exit aperture 126 of the light source package 125. The reflector 150 further includes an output aperture 154 and one or more sidewalls 155 between the input aperture 152 and the output aperture 154. One or more sidewalls 155 can be configured to collimate light propagating from the light source 120.

Figure 7B:
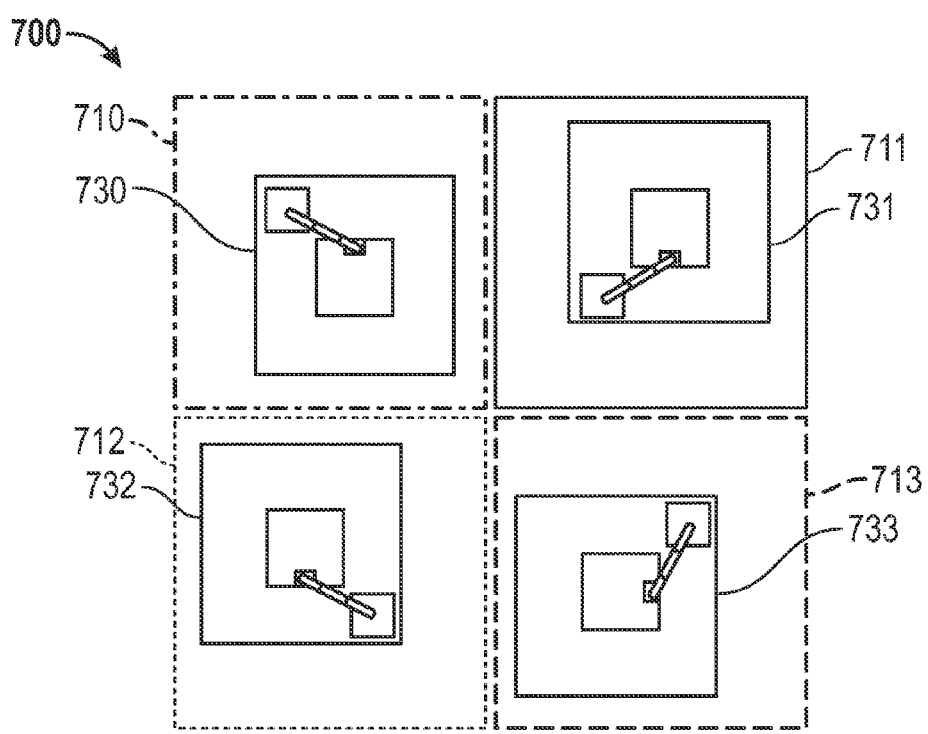
FIG. 7B shows a top view of an example arrangement of four reflectors within four sections of a flash illumination system.

FIG. 7B shows a top view of an example arrangement of four reflectors within four sections of a flash illumination system. In FIG. 7B, the example flash illumination system 700 includes four sections 710, 711, 712, and 713. A first section 710 includes a first reflector having an input aperture 730 in a lower right portion of the first section 710. Lateral to the first section 710 is a second section 711. The second section 711 includes a second reflector having an input aperture 731 an upper right portion of the second section 711. Lateral to the first section 710 and caddy-corner to the second section 711 is a third section 712. The third section 712 includes a third reflector having an input aperture 732 in an upper left portion of the third section 712. Lateral to the second section 711, lateral to the third section 712, and caddy-corner to the first section 710 is a fourth section 713. The fourth section 713 includes a fourth reflector having an input aperture 733 in a lower left portion of the fourth section 713. In this implementation, the input apertures 730, 731, 732, and 733 of the reflectors are asymmetric with each of the other input apertures, which can provide better color uniformity, spatial uniformity, and/or efficient field coverage than some conventional flash illumination systems. Other arrangements are possible, e.g., the reflectors can be arranged as shown in FIG. 3B. In certain implementations, the light-emitting regions 122 are arranged within each section such that the light-emitting regions 122 are not blocked from use by the sloping sidewalls 155 of the reflectors 150 and such that the flux from the light-emitting regions 122 is available for output through the reflectors 150.

Some implementations can be analyzed in a ray trace program as the reflector length L is systematically reduced from the Sine Law reflector design described herein. The collimation half angle θ also can be systematically increased in compensation for the light spreading associated with the reduced size of the reflector 150. In these implementations, the systematic reduction of the reflector length L and collimation half angles θ can occur while monitoring the shape and optical uniformity of the output light in the vicinity of the designated subject. In some instances, these implementations can lead to the shortest possible reflector length substantially producing (e.g., producing) the desired field pattern surrounding the subject having the targeted angular extent in each meridian. These implementations also can allow selecting the combination of length reduction and increased angular collimation that achieves the desired spatial and color light uniformity around the subject.

In some implementations, the length L of the reflector 150 is less than the length calculated for an ideal mathematically shaped reflector. The length L of the reflector 150 can be designed to be the length L for a first half angle $θ_1$, but the reflector 150 is then truncated to a length L that would be designed for a second half angle $θ_2$ that is greater than the first half angle $θ_1$. For example, if the desired collimation half angle θ is ±30°, the length L can be calculated ($L=0.5*(w_1+w_2)/\tan 30°=0.9*(w_1+w_2)$). If the desired collimation half angle θ is ±25°, the length L can be calculated ($L=0.5*(w_1+w_2)/\tan 25°=1.1*(w_1\ w_2)$), and the length L can then be truncated to $0.9*(w_1+w_2)$, which would be the calculated length if the desired collimation half angle θ was ±30°. In these implementations, the reflector can still substantially preserve etendue with regard to its non-ideal (truncated) boundary conditions, and may also provide desired uniformity. In certain other implementations, the length L is calculated for the second half angle $\theta_2$ and then lengthened to a length L that would be designed for a first half angle $\theta_1$ that is less than the second half angle $\theta_2$.

In some implementations, the length L of the reflector 150 is less than the length calculated for a mathematically shaped reflector due to geometrical constraints, For example, the length L of the reflector 150 can be designed to be the length L for a collimation half angle $\theta$, but the reflector 150 is then truncated to a length L for a given specification (e.g., thickness) of the device. Because truncation may result in a widened output angle, some implementations provide compensation by redesigning for a narrower collimation half angle $\theta$. For example, in some camera flash illumination systems 100 for cellular phones, a collimation half angle $\theta$ of about ±30° is desired. The flash illumination system 100 can include a reflector 150 having a 2.5 mm×2.5 mm output aperture 154. From Equations (2A) and (3), using 2.5 mm as $w_2$, the ideal length L of the reflector 150 can be calculated:

$$w_1 = w_2 \times \sin\theta = 2.5 \text{ mm} \times \sin 30° = 1.25 \text{ mm}$$

$$L = 0.5*(w_1+w_2)/\tan\theta = 0.5*(1.25 \text{ mm} + 2.5 \text{ mm})/\tan 30° = 3.25 \text{ mm}$$

The ideal length L of the reflector 150 in this example is about 3.25 mm, which may be too tall for some cellular phone thickness specifications, e.g., 1 mm to about 1.5 mm. As mentioned above, to compensate for a widened output angle due to truncation, certain implementations can be redesigned for a narrower collimation half angle $\theta$. For example, using a collimation half angle $\theta$ of about ±25°, the ideal length L of the reflector 150 can be calculated from Equations (2A) and (3):

$$w_1 = w_2 \times \sin\theta = 2.5 \text{ mm} \times \sin 25° = 1.06 \text{ mm}$$

$$L = 0.5*(w_1+w_2)/\tan\theta = 0.5*(1.06 \text{ mm} + 2.5 \text{ mm})/\tan 25° = 3.81 \text{ mm}$$

As shown above, the ideal length L for the narrower collimation half angle of about ±25° is about 3.81 mm. Using a ray trace program, truncating from about 3.25 mm to about 1.5 mm gives a wider angular distribution than truncating from about 3.81 mm to about 1.5 mm. Thus, certain implementations can provide compensation for a widened output angle from truncation by designing the reflector 150 using a narrower collimation half angle $\theta$ prior to truncation.

In certain implementations, the reflector 150 of one or more of the sections 110, 111, 112, and 113 of the flash illumination system 100 is at least partially filled with a material. Example materials include a gas, e.g., air, or a solid, e.g., a polymer. A material having a refractive index greater than one may increase the length L of the reflector 150, but may provide rigidity. In some implementations, one or more of the sections 110, 111, 112, and 113 of the flash illumination system 100 includes an optical element proximate to the output aperture 154 (not shown). For example, the optical element(s) can include at least one of a lens, a mirror, or a color filter. An optical element may also increase the rigidity of the reflector 150 proximate to the output aperture 154.

Figure 8A:
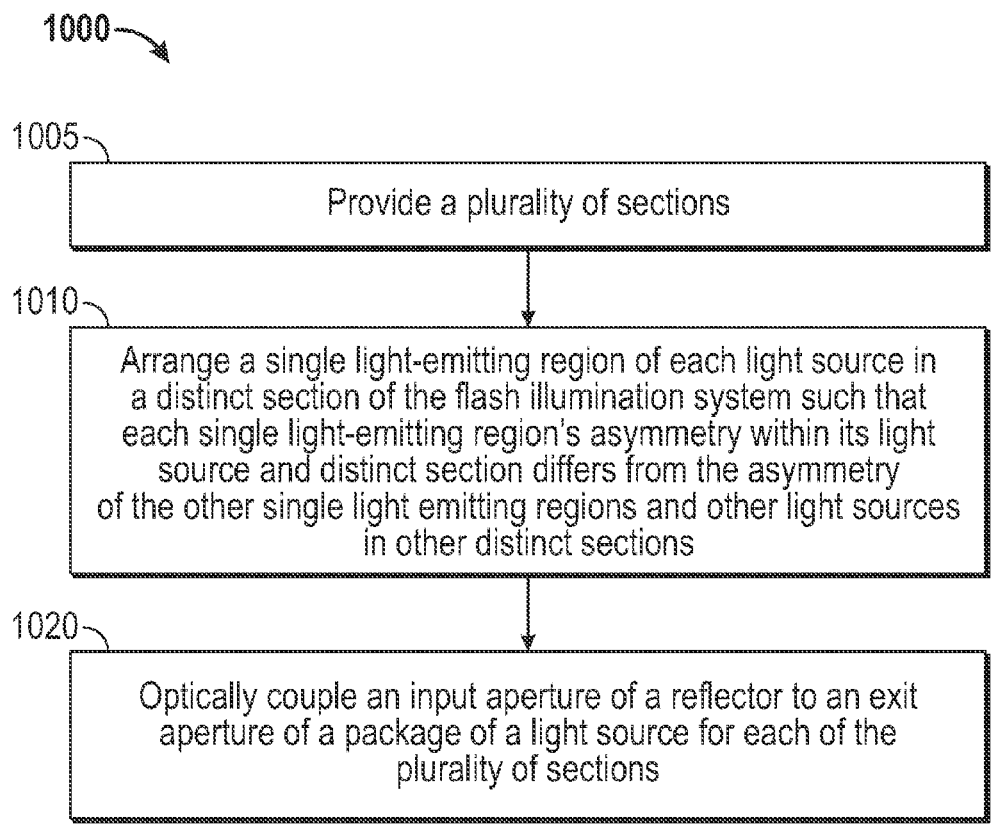
FIG. 8A shows an example method for fabricating a flash illumination system showing improved color uniformity and spatial uniformity.

FIG. 8A shows an example method for fabricating a flash illumination system showing improved color uniformity and spatial uniformity. The example method 1000 can be used to fabricate, for example, the flash illumination system 100 described herein. For example, as shown in block 1005, the method 1000 includes providing a plurality of sections. Then the method 1000 transitions into block 1010, in which a single light-emitting region of each light source in a distinct section of the flash illumination system is arranged such that each single light-emitting region's asymmetry within its light source and distinct section differs from the asymmetry of other single light emitting regions and other light sources in other distinct sections. For example, the block 1010 may include one or more of positioning the single light-emitting regions in a cavity of the housing, electrically connecting the single light-emitting region, and encapsulating the single light-emitting region with resin (e.g., including phosphor). Each single light-emitting region 122 can, in some implementations, include a blue LED chip, and the package 125 can include yellow phosphor surrounding the blue LED chip. Then the method 1000 transitions into block 1020.

As shown in block 1020, the method 1000 also includes optically coupling an input aperture 152 of a reflector 150 to an exit aperture 126 of a light source 120 for each of the plurality of sections. As described herein, the light source 120 can include a single light-emitting region 122 having a first centroid 124. The exit aperture 126 has a second centroid 127. The first centroid 124 is laterally offset from the second centroid 127. The reflector 150 includes one or more sidewalls 155 between the input aperture 152 and the output aperture 154. One or more sidewalls 155 are configured to collimate light propagating from the light source 120. In some implementations, the reflector 150 can substantially preserve etendue (e.g., can preserve etendue). Optically coupling the input aperture 152 to the exit aperture 126 as shown in block 1020 can include, in some implementations, optically coupling four input apertures to four exit apertures in four sections in a cross-quad configuration.

Figure 8B:
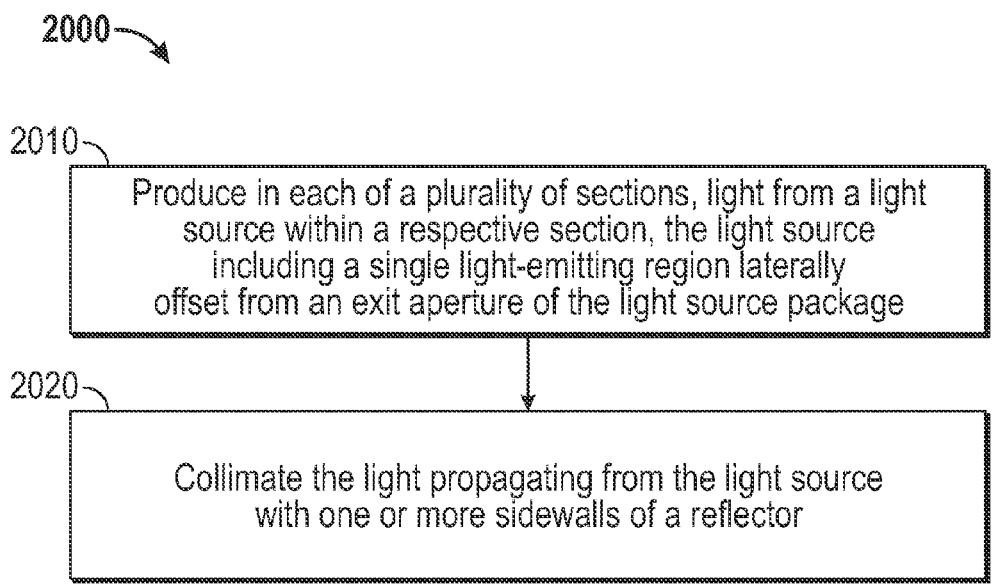
FIG. 8B shows an example method of providing flash illumination.

FIG. 8B shows an example method of providing flash illumination. For example, the method 2000 can provide flash illumination from a flash illumination system 100 having a plurality of sections as described herein. For example, the method 2000 includes, in each of the plurality of sections, producing light from a light source 120 within a respective section as shown in block 2010. The light source 120 includes a single light-emitting region 122 that is laterally offset from an exit aperture 126 of the light source package 125. For example, the light source 120 can include a single light-emitting region 122 and a package 125 surrounding the single light-emitting region 122. The single light-emitting region 122 can have a first centroid 124. The package 125 can have an exit aperture 126 having a second centroid 127. The first centroid 124 of the single light-emitting region 122 can be laterally offset from the second centroid 127 of the exit aperture 126 of the package 125. The method 2000 further can include collimating the light propagating from the light source 120 with one or more sidewalls 155, e.g., 156, 157, 158, and 159, of a reflector 150 as shown in block 2020. One or more sidewalls 155, e.g., 156, 157, 158, and 159 of the reflector 150 can be between an input aperture 152 and an output aperture 154. The input aperture 152 can be optically coupled to the exit aperture 126 of the package 125. Collimating the light, as shown in block 2020, can include in some implementations, substantially preserving etendue (e.g., preserving etendue).

In some implementations, the single light-emitting region 122 can include a blue LED chip, and the package 125 can include yellow phosphor surrounding the blue LED chip. In some methods 2000, the sections can include four sections in a cross-quad configuration. The single light-emitting regions within the four sections can be asymmetric with each of the other single light-emitting regions.

Figure 9A:
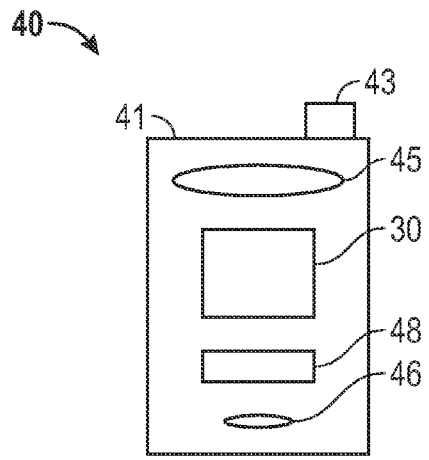
FIGS. 9A-9C show examples of system block diagrams illustrating a display device that includes a camera lens and a flash illumination system.
Figure 9B:
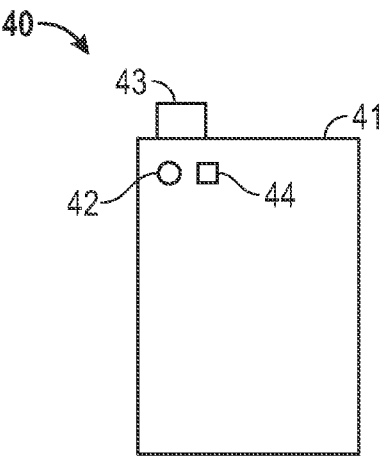
Figure 9C:
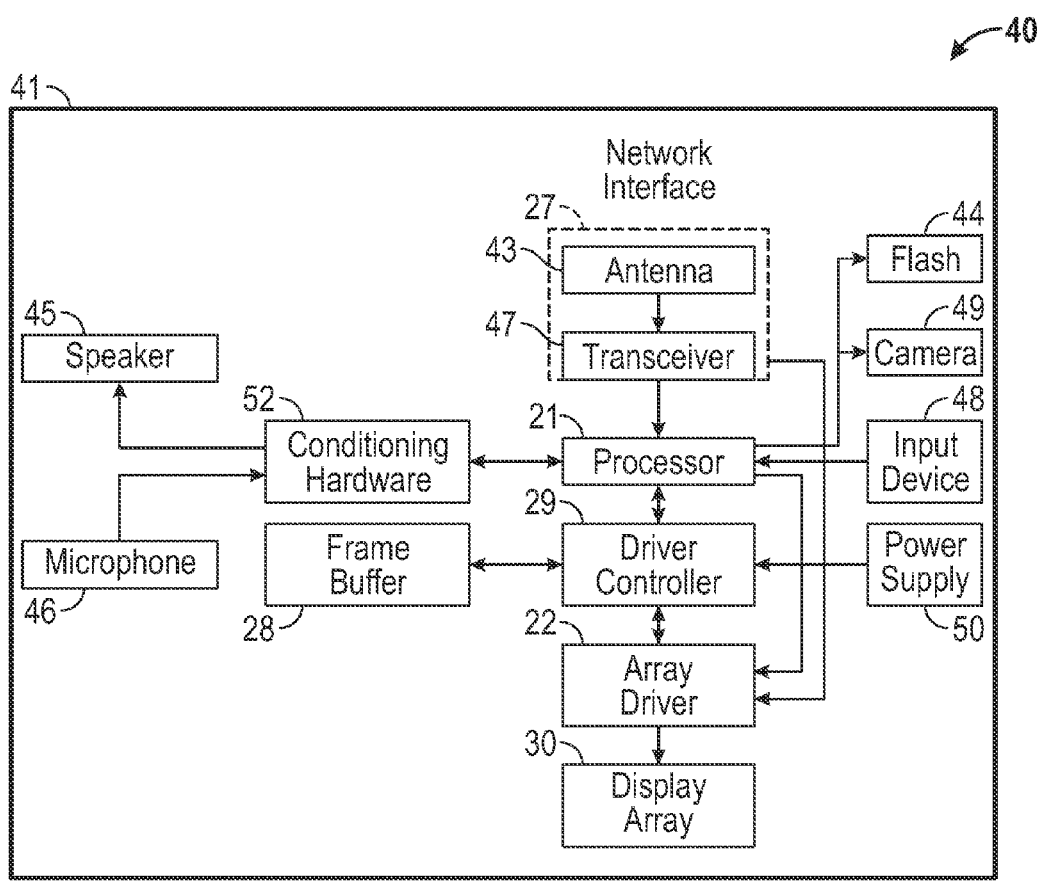

FIGS. 9A-9C show examples of system block diagrams illustrating a display device 40 that includes a camera lens 42 and a flash illumination system 44. FIG. 9A shows the front view of the display device 40 and FIG. 9B shows the rear view. The display device 40 can be a device having a built-in camera, for example, a smart phone, a cellular telephone, or a mobile telephone. Components of the display device 40 or slight variations thereof are also illustrative of various types of display devices with image capturing capability such as portable computers, notebooks, netbooks, tablet personal computers, and portable media players.

The display device 40 includes a housing 41, a display 30, a camera 49, a camera lens 42, an antenna 43, a flash illumination system 44, a speaker 45, an input device 48 (which may be integrated with the display 30 such as a touch screen), and a microphone 46. The housing 41 can be formed from any of a variety of manufacturing processes, including injection molding and vacuum forming. The housing 41 may be made from any of a variety of materials, including, but not limited to: plastic, metal, glass, rubber, ceramic, combinations thereof, and the like. The housing 41 can include removable portions (not shown) that may be interchanged with other removable portions of different color, or containing different logos, pictures, or symbols.

The display 30 may be any of a variety of displays, including a bi-stable, multi-state, or analog display. The display 30 also can be configured to include a flat-panel display, such as plasma, EL, OLED, STN LCD, or TFT LCD, or a non-flat-panel display, such as a CRT or other tube device. The display 30 can include an interferometric modulator (IMOD) display. The display device 40 can also include an image capturing module, e.g., a camera 49, a camera lens 42, and a flash illumination system 44. The flash illumination system 44 (and components thereof) may be generally similar to the flash illumination system described with reference to FIGS. 1A-7B.

The components of the display device 40 are schematically illustrated in FIG. 9C. The display device 40 includes a housing 41 and can include additional components at least partially enclosed therein. For example, the display device 40 includes a camera 49 and a flash illumination system 44. The display device 40 also includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48, a camera 49, a flash illumination system 44, and a driver controller 29. The processor 21 can include software, code, or one or more applications to control the camera 49 and/or flash illumination system 44. For example, the processor 21 can control the camera 49 and/or flash illumination system 44 in response to user input from the input device 48 (e.g., user control keys) and/or in response to sensor signals from a sensor (e.g., an ambient light sensor). The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller, a bi-stable display controller (e.g., an IMOD controller), or a multi-state display controller. Additionally, the array driver 22 can be a conventional driver, a bi-stable display driver (e.g., an IMOD display driver), or a multi-state display controller. Moreover, the display array 30 can be a conventional display array, a bi-stable display array (e.g., a display including an array of IMODs), or a multi-state display array. In some implementations, the driver controller 29 can be integrated with the array driver 22. Such an implementation is common in highly integrated systems such as cellular or mobile phones, portable electronic devices, watches, and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. A person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the flash illumination system as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations. Additionally, other implementations are within the scope of the following claims. In some cases, the actions recited in the claims can be performed in a different order and still achieve desirable results.

What is claimed is:

1. A flash illumination system comprising:
    four sections in a cross-quad configuration, the four sections including a first section, a second section lateral to the first section, a third section lateral to the first section and caddy-corner to the second section, and a fourth section lateral to the second section, lateral to the third section, and caddy-corner to the first section, each of the four sections including:

a light source including
   a single light-emitting region having a first centroid, and
   a package surrounding the single light-emitting region, the package having an exit aperture, the exit aperture having a second centroid, the first centroid laterally offset from the second centroid; and
a reflector including
   an input aperture optically coupled to the exit aperture of the package,
   an output aperture, and
   one or more sidewalls between the input aperture and the output aperture, the one or more sidewalls configured to collimate light propagating from the light source,
wherein the four sections include
   a first single light-emitting region, the first centroid of the first single light-emitting region in a lower right portion of the first section,
   a second single light-emitting region, the first centroid of the second single light-emitting region in an upper right portion of the second section,
   a third single light-emitting region, the first centroid of the third single light-emitting region in an upper left portion of the third section, and
   a fourth single light-emitting region, the first centroid of the fourth single light-emitting region in a lower left portion of the fourth section, or
wherein the four sections include
   a fifth single light-emitting region, the first centroid of the fifth single light-emitting region in an upper right portion of the first section,
   a sixth single light-emitting region, the first centroid of the sixth single light-emitting region in a lower left portion of the second section,
   a seventh single light-emitting region, the first centroid of the seventh single light-emitting region in the upper left portion of the third section, and
   an eighth single light-emitting region, the first centroid of the eighth single light-emitting region in a lower right portion of the fourth section.

2. The flash illumination system of claim 1,
wherein the single light-emitting region includes a light emitting diode (LED) chip, and
wherein the package includes phosphor surrounding the LED chip.

3. The flash illumination system of claim 2,
wherein the LED chip includes a blue LED chip, and
wherein the phosphor includes yellow phosphor.

4. The flash illumination system of claim 2, wherein the package includes a resin including the phosphor.

5. The flash illumination system of claim 1,
wherein the single light-emitting region includes a plurality of light emitting diode (LED) chips, and
wherein the package includes phosphor surrounding the plurality of LED chips.

6. The flash illumination system of claim 1, wherein the light sources are configured to output white light.

7. The flash illumination system of claim 1, wherein the reflectors are configured to substantially preserve etendue.

8. The flash illumination system of claim 7, wherein the reflectors are configured to collimate light propagating from the light source at a half angle from about ±90 degrees to about ±30 degrees off a normal direction.

9. The flash illumination system of claim 7, wherein a distance between the input aperture and the output aperture of the reflectors is less than a calculated length configured to preserve etendue for a mathematically shaped reflector.

10. The flash illumination system of claim 9, wherein the calculated length is at least partially based on a first width of the input aperture, a second width of the output aperture, and a half angle of the collimated light propagating from the reflectors.

11. The flash illumination system of claim 1, wherein the sections include an optical element proximate to the output aperture.

12. The flash illumination system of claim 11, wherein the optical element includes at least one of a lens, a mirror, and a color filter.

13. A flash illumination system comprising:
   four sections in a cross-quad configuration, the four sections including a first section, a second section lateral to the first section, a third section lateral to the first section and caddy-corner to the second section, and a fourth section lateral to the second section, lateral to the third section, and caddy-corner to the first section, each of the four sections including:
      means for producing light including
         means for emitting light, the light-emitting means having a first centroid, and
         a package surrounding the light-emitting means, the package having an exit aperture, the exit aperture having a second centroid, the first centroid laterally offset from the second centroid; and
      means for collimating light propagating from the light-producing means,
   wherein the four sections include
      a first light-emitting means, the first centroid of the first light-emitting means in a lower right portion of the first section,
      a second light-emitting means, the first centroid of the second light-emitting means in an upper right portion of the second section,
      a third light-emitting means, the first centroid of the third light-emitting means in an upper left portion of the third section, and
      a fourth light-emitting means, the first centroid of the fourth light-emitting means in a lower left portion of the fourth section, or
   wherein the four sections include
      a fifth light-emitting means, the first centroid of the fifth light-emitting means in an upper right portion of the first section,
      a sixth light-emitting means, the first centroid of the sixth light-emitting means in a lower left portion of the second section,
      a seventh light-emitting means, the first centroid of the seventh light-emitting means in the upper left portion of the third section, and
      an eighth light-emitting means, the first centroid of the eighth light-emitting means in a lower right portion of the fourth section.

14. The flash illumination system of claim 13,
wherein the light-producing means includes a light source, or
wherein the light-emitting means includes a single light-emitting region, or
wherein the light-collimating means includes a reflector including
   an input aperture optically coupled to the exit aperture of light-producing means,
   an output aperture, and one or more sidewalls between the input aperture and the output aperture.

15. The flash illumination system of claim 13, wherein the light-producing means includes means for luminescing surrounding the light-emitting means.

16. The flash illumination system of claim 15,
wherein the light-emitting means includes a light emitting diode (LED) chip or a plurality of LED chips, and
wherein the luminescing means includes phosphor.

17. The flash illumination system of claim 16,
wherein the LED chip or the plurality of LED chips includes a blue LED chip or a plurality of blue LED chips, and
wherein the phosphors include yellow phosphor.

18. The flash illumination system of claim 13, wherein the light-collimating means are configured to substantially preserve etendue.

19. A method for fabricating a flash illumination system, the method comprising:
providing four sections in a cross-quad configuration in the flash illumination system, the four sections including a first section, a second section lateral to the first section, a third section lateral to the first section and caddy-corner to the second section, and a fourth section lateral to the second section, lateral to the third section, and caddy-corner to the first section;
for each of the four sections, optically coupling an input aperture of a reflector to an exit aperture of a package of a light source, the light source including a single light-emitting region having a first centroid, the exit aperture having a second centroid, the first centroid laterally offset from the second centroid, and the reflector including one or more sidewalls between the input aperture and an output aperture, the one or more sidewalls configured to collimate light propagating from the light source; and
arranging each of the single light-emitting regions within the cross-quad configuration
such that the four sections include
a first single light-emitting region, the first centroid of the first single light-emitting region in a lower right portion of the first section,
a second single light-emitting region, the first centroid of the second single light-emitting region in an upper right portion of the second section,
a third single light-emitting region, the first centroid of the third single light-emitting region in an upper left portion of the third section, and
a fourth single light-emitting region, the first centroid of the fourth single light-emitting region in a lower left portion of the fourth section, or
such that the four sections include
a fifth single light-emitting region, the first centroid of the fifth single light-emitting region in an upper right portion of the first section,
a sixth single light-emitting region, the first centroid of the sixth single light-emitting region in a lower left portion of the second section,
a seventh single light-emitting region, the first centroid of the seventh single light-emitting region in the upper left portion of the third section, and
an eighth single light-emitting region, the first centroid of the eighth single light-emitting region in a lower right portion of the fourth section.

20. The method of claim 19,
wherein the single light-emitting regions include a blue LED chip, and
wherein the packages include yellow phosphor surrounding the blue LED chip.

21. The method of claim 19, wherein the reflectors are configured to substantially preserve etendue.

22. A method of providing flash illumination, the method including, in each of four sections in a cross-quad configuration, the four sections including a first section, a second section lateral to the first section, a third section lateral to the first section and caddy-corner to the second section, and a fourth section lateral to the second section, lateral to the third section, and caddy-corner to the first section:
producing light from a light source within a respective section, the light source including
a single light-emitting region having a first centroid, and
a package surrounding the single light-emitting region, the package having an exit aperture, the exit aperture having a second centroid, the first centroid laterally offset from the second centroid; and
collimating the light propagating from the light source with one or more sidewalls of a reflector, the one or more sidewalls between an input aperture and an output aperture, the input aperture optically coupled to the exit aperture of the package,
wherein the four sections include
a first single light-emitting region, the first centroid of the first single light-emitting region in a lower right portion of the first section,
a second single light-emitting region, the first centroid of the second single light-emitting region in an upper right portion of the second section,
a third single light-emitting region, the first centroid of the third single light-emitting region in an upper left portion of the third section, and
a fourth single light-emitting region, the first centroid of the fourth single light-emitting region in a lower left portion of the fourth section, or
wherein the four sections include
a fifth single light-emitting region, the first centroid of the fifth single light-emitting region in an upper right portion of the first section,
a sixth single light-emitting region, the first centroid of the sixth single light-emitting region in a lower left portion of the second section,
a seventh single light-emitting region, the first centroid of the seventh single light-emitting region in the upper left portion of the third section, and
an eighth single light-emitting region, the first centroid of the eighth single light-emitting region in a lower right portion of the fourth section.

23. The method of claim 22,
wherein each of the single light-emitting regions includes a blue LED chip, and
wherein each of the packages includes yellow phosphor surrounding the blue LED chip.

24. The method of claim 22, wherein collimating the light includes substantially preserving etendue.

* * * * *